(12) United States Patent
Terasaki (10) Patent No.: US 7,787,339 B2
(45) Date of Patent: Aug. 31, 2010

(54) REPRODUCING POSITION CONTROL CIRCUIT AND REPRODUCING SYSTEM

(75) Inventor: Setsuo Terasaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 483 days.

(21) Appl. No.: 11/943,125

(22) Filed: Nov. 20, 2007

(65) Prior Publication Data

US 2008/0123485 A1    May 29, 2008

(30) Foreign Application Priority Data

Nov. 24, 2006   (JP)   ............................. 2006-317034

(51) Int. Cl.
*G11B 7/00* (2006.01)
(52) U.S. Cl. .................................. 369/53.18
(58) Field of Classification Search ........................ None
See application file for complete search history.

(56) References Cited

U.S. PATENT DOCUMENTS

| | | | |
|---|---|---|---|
| 5,414,861 A | 5/1995 | Horning | |
| 5,748,596 A * | 5/1998 | Nakamichi | 369/30.9 |
| 6,553,532 B1 * | 4/2003 | Aoki | 714/763 |
| 6,570,837 B1 | 5/2003 | Kikuchi et al. | |
| 6,631,101 B1 * | 10/2003 | Chan et al. | 369/30.36 |
| 7,143,309 B2 * | 11/2006 | Yoshida | 714/8 |
| 7,280,452 B2 * | 10/2007 | Lee | 369/53.18 |
| 2003/0028733 A1 | 2/2003 | Tsunoda et al. | |
| 2003/0101327 A1 * | 5/2003 | Beck | 711/206 |
| 2004/0174786 A1 * | 9/2004 | Nishikawa | 369/47.33 |
| 2008/0253243 A1 * | 10/2008 | Geusens | 369/47.1 |

FOREIGN PATENT DOCUMENTS

| | | |
|---|---|---|
| JP | 2002-223411 | 8/2002 |
| JP | 2003-203464 | 7/2003 |

* cited by examiner

*Primary Examiner*—Peter Vincent Agustin
(74) *Attorney, Agent, or Firm*—Turocy & Watson, LLP (57) ABSTRACT

A reproducing position control circuit has a reading part for reading data stored in a recording medium, a position information detecting part for detecting the position information of data read by said reading part within said recording medium, and a control part for storing said position information detected by said position information detecting part in a volatile memory, and retrieving said position information within said volatile memory to store it in a writable non-volatile memory when the power is turned off or after a predetermined time passes since the power is turned off.

17 Claims, 11 Drawing Sheets

REPRODUCING POSITION CONTROL CIRCUIT AND REPRODUCING SYSTEM

CROSS REFERENCE TO RELATED APPLICATIONS

This application is based upon and claims the benefit of priority from the prior Japanese Patent Application No. 2006-317034, filed on Nov. 24, 2006, the entire contents of which are incorporated herein by reference.

BACKGROUND OF THE INVENTION

The present invention relates to a reproducing position control circuit and a reproducing system.

In recent years, some disk reproducing apparatuses for a CD or DVD have a follow-up reproduction function of storing the reproducing position information in a storage part when the power is turned off and continuing the reproduction from the continuing position by referring to the reproducing position information when the power is turned on later. In a disk reproducing apparatus for home use, a non-volatile memory that needs no backup power source is used for this storage part (e.g., refer to Japanese Patent Application Laid-Open No. 2003-203464).

On the other hand, in a reproducing apparatus mounted on the vehicle, since it is unknown when the power fails if an accessory power source is not enough in rotating a sel-motor or starting an air conditioner, the reproducing position information is acquired periodically (e.g., every second) and stored in a RAM, and a backup power is supplied to the RAM to hold the reproducing position information when the power is cut off (e.g., refer to Japanese Patent Application Laid-Open No. 2002-223411).

Herein, the reason why the RAM, but not the non-volatile memory, is used as the storage part is that the non-volatile memory is limited in the number of rewrites. For example, if the reproducing position information is rewritten at every second for one day, the number of writes is as large as 60 (sec)×60 (min)×24 (hour)=86400 times, whereby the non-volatile memory such as a flash ROM or an EEPROM in which the number of rewrites is about tens of thousands of times is unsuitable for the reproducing apparatus mounted on the vehicle.

A capacitor, for example, is used as the backup power source for the RAM, but if the charging is not made by starting up an engine of the vehicle, the backup power source is exhausted. Accordingly, there was a problem that if the charging is not made for a long time, the reproducing position information stored in the RAM disappears, disabling the follow-up reproduction.

SUMMARY OF THE INVENTION

According to one aspect of the present invention, there is provided a reproducing position control circuit comprising:

a reading part for reading data stored in a recording medium;

a position information detecting part for detecting the position information of data read by said reading part within said recording medium; and a control part for storing said position information detected by said position information detecting part in a volatile memory, and retrieving said position information within said volatile memory to store it in a writable non-volatile memory when the power is turned off or after a predetermined time passes since the power is turned off.

According to one aspect of the present invention, there is provided a reproducing position control circuit comprising:

a reading part for reading data stored in a recording medium;

a position information detecting part for detecting the position information of data read by said reading part within said recording medium; and a control part for storing said position information detected by said position information detecting part in a volatile memory, and retrieving said position information within said volatile memory to store in a writable non-volatile memory, if the voltage of a backup power source, which is turned on when the power supply is turned off, is less than or equal to a predetermined value.

According to one aspect of the present invention, there is provided a reproducing system comprising:

a reading part for reading data stored in a recording medium;

a reproduction processing part for reproducing and outputting the read data;

a position information detecting part for detecting the position information of data read by said reading part within said recording medium;

a power off detecting part for detecting that the power is turned off to output a power off detection signal;

a volatile memory capable of storing said position information;

a writable non-volatile memory capable of storing said position information; and a control part for storing said position information detected by said position information detecting part in said volatile memory, and retrieving said position information within said volatile memory and storing it in said non-volatile memory, based on said power off detection signal.

DESCRIPTION OF THE EMBODIMENTS

A reproducing position control circuit and a reproducing system according to an embodiment of the present invention will be described below with reference to the drawings.

First Embodiment

Figure 1:
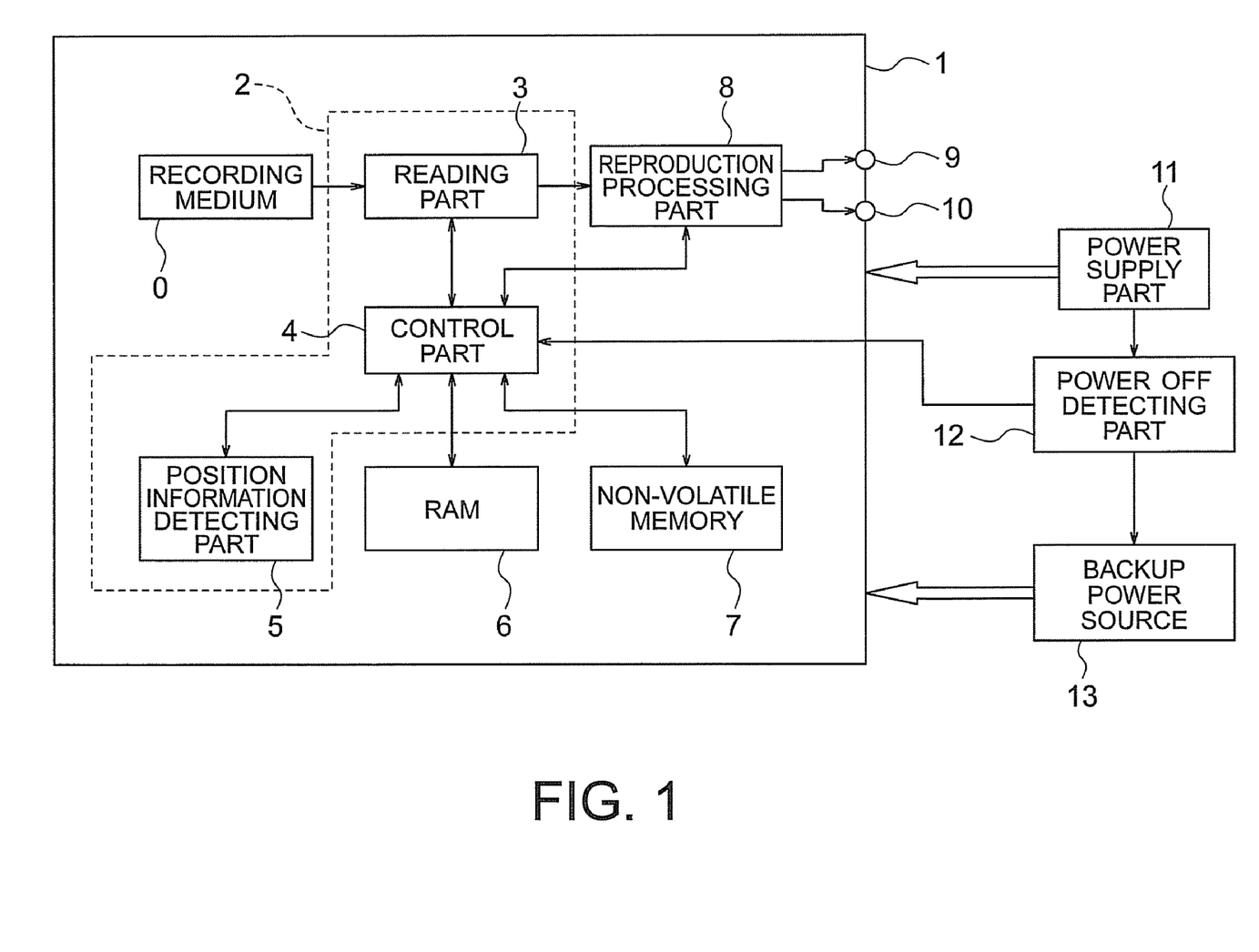
FIG. 1 is a diagram showing the schematic configuration of a reproducing system according to a first embodiment of the present invention.

FIG. 1 shows the schematic configuration of a reproducing system according to a first embodiment of the invention. The reproducing system has a reproducing apparatus 1, a power supply part 11, a power off detecting part 12 and a backup power source 13.

The reproducing apparatus 1 has a reproducing position control circuit 2, a reproduction processing part 8, a video output terminal 9, a voice output terminal 10, a RAM 6 such as a DRAM or SRAM as a volatile memory, and a writable non-volatile memory 7. The reproducing position control circuit 2 has a reading part 3, a control part 4 and a position information detecting part 5.

In the reproducing apparatus 1, the video/voice data recorded on a recording medium 0 such as a DVD is read by the reading part 3. The read data is decoded by the reproduction processing part 8, whereby a video signal is outputted via the video output terminal 9 and a voice signal is outputted via the voice output terminal 10.

The control part 4 controls the reading part 3 and the reproduction processing part 8, and outputs a position detection control signal to the position information detecting part 5 to operate to periodically (e.g., every second) detect the information indicating the position of data read by the reading part 3 on the recording medium 0 (hereinafter referred to as reproducing position information). The reproducing position information detected by the position information detecting part 5 is written into a RAM 6 by the control part 4.

Figure 2:
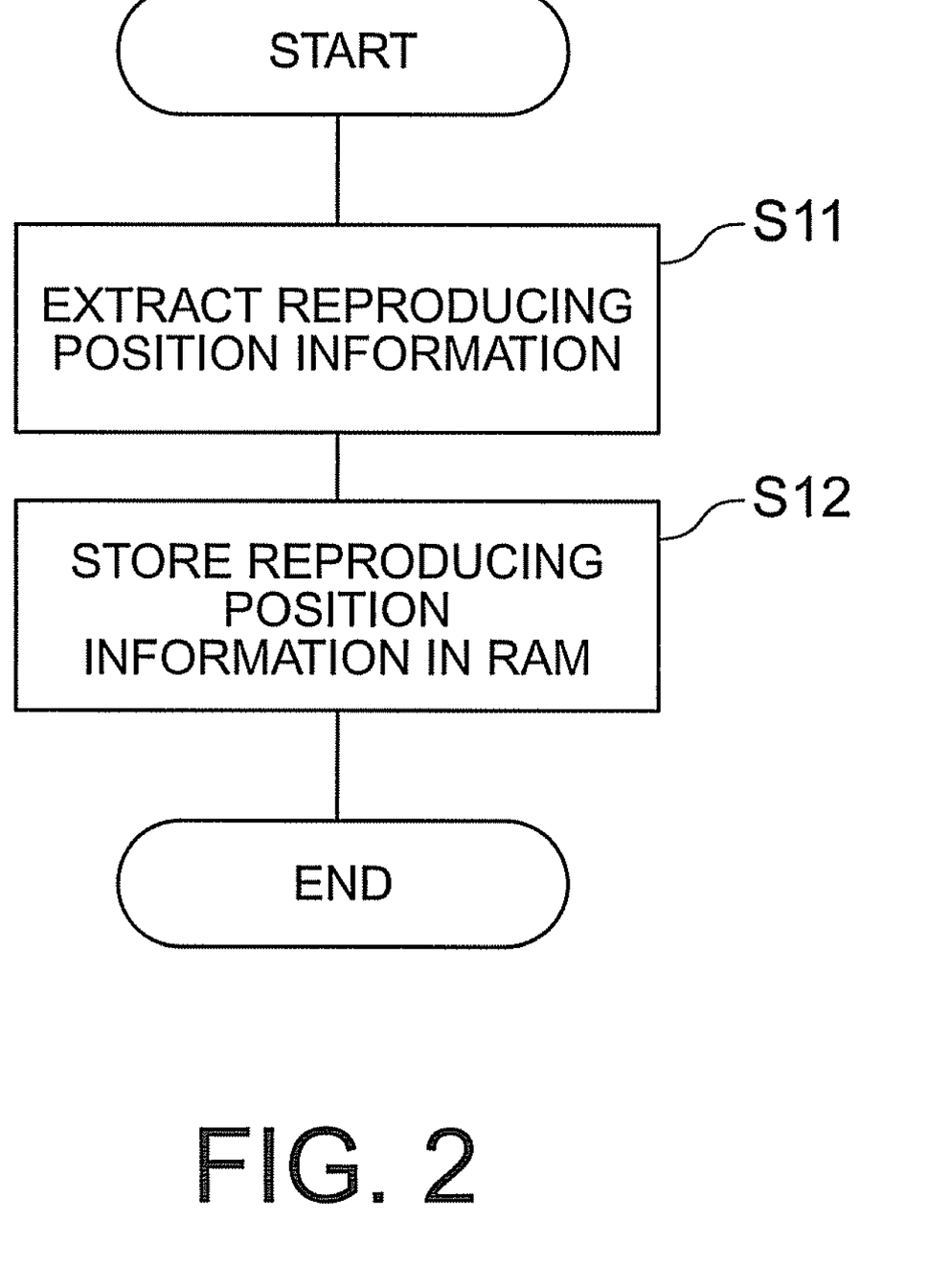
FIG. 2 is a flowchart showing an operation flow of storing the reproducing position information in a RAM.

FIG. 2 shows an operation flow of storing the reproducing position information in the RAM 6 during reproducing operation. The position information detecting part 5 detects the reproducing position information of the data read by the reading part 3, based on a position detection control signal outputted from the control part 4 (step S11), and the detected reproducing position information is stored in the RAM 6 by the control part 4 (step S12).

The power supply part 11 supplies power to the reproducing apparatus 1. The power off detecting part 12 detects that the power is cut, and outputs a power off detection signal. The backup power source 13 is turned on based on the power off detection signal, to supply power to the control part 4, the RAM 6 and the non-volatile memory 7. The backup power source 13 is a super-capacitor (electrical double layer condenser), for example.

The control part 4 retrieves the reproducing position information stored in the RAM 6, based on the power off detection signal and stores it in the non-volatile memory 7. When the power is next turned on, namely, when power is supplied from the power supply part 11 to the reproducing apparatus 1, the follow-up reproduction can be performed by referring to the reproducing position information stored in the non-volatile memory 7.

While the power is on, the reproducing position information is written in the RAM 6, which is not limited in the number of writes, periodically, or many times, and only when the power is turned off, the reproducing position information is written into the non-volatile memory 7, whereby the number of writes into the non-volatile memory can be suppressed.

By using the non-volatile memory, the reproducing position information can be held even if the backup power is cut. Even if there is a long time before the power is turned on at the next time, the reproducing position information does not disappear and the follow-up reproduction can be performed.

Also, the backup power source 13 is required to supply power only while the reproducing position information stored in the RAM 6 is written into the non-volatile memory 7, whereby a capacity of the backup power source may be reduced to a several hundredth.

In this manner, with the reproducing system according to this embodiment, acquiring and rewriting the reproducing position information are performed many times, and even when the power is turned off, the reproducing position information can be held securely.

Second Embodiment

Figure 3:
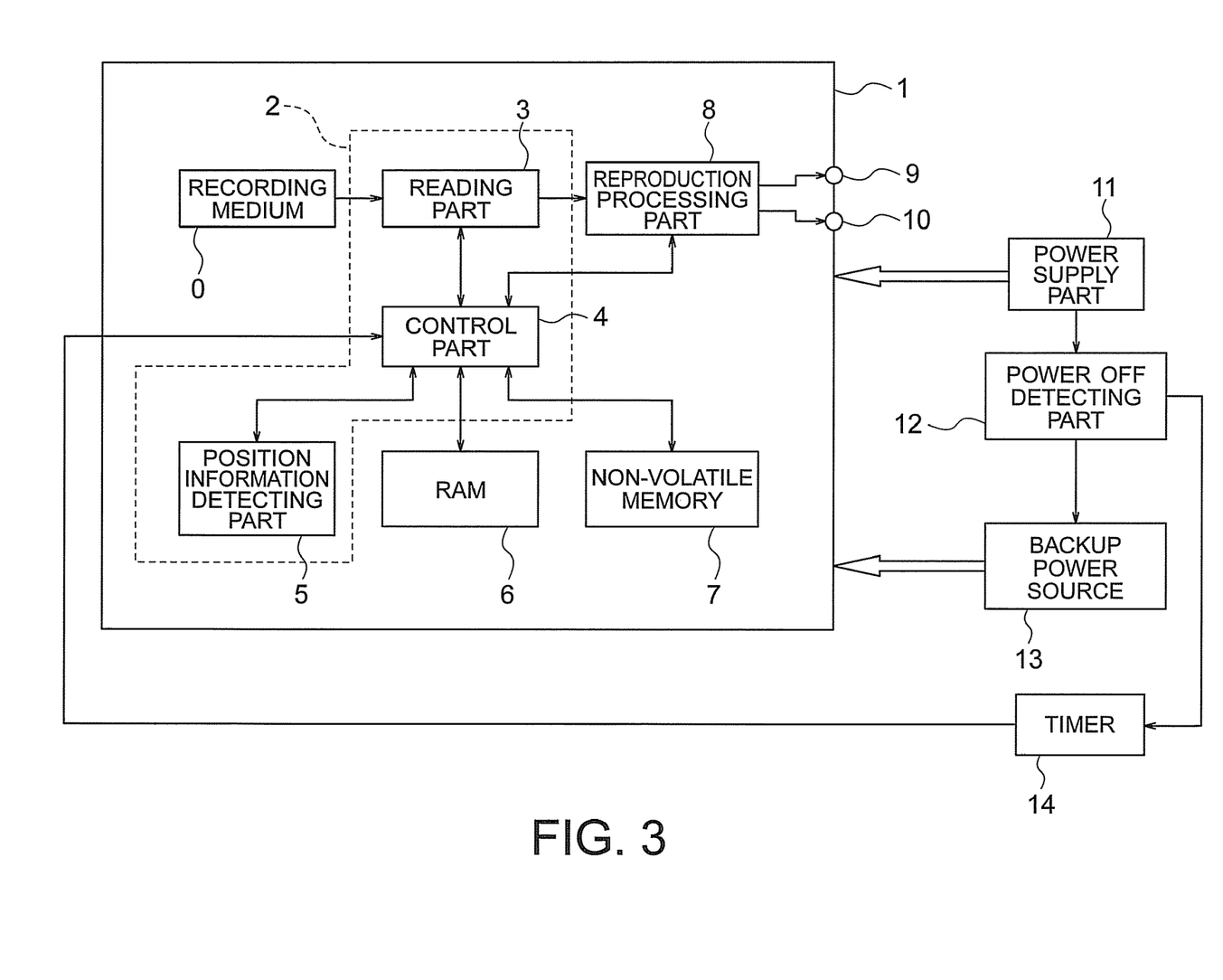
FIG. 3 is a diagram showing the schematic configuration of a reproducing system according to a second embodiment of the invention.

FIG. 3 shows the schematic configuration of a reproducing system according to a second embodiment of the invention. The same parts are designated by the same numerals as in FIG. 1. A timer 14 starts counting based on a power off detection signal outputted from the power off detecting part 12, and if the value of the timer reaches a predetermined value, namely, if a predetermined time passes since the power is cut, a time passage signal is outputted to the control part 4.

The control part 4 retrieves the reproducing position information stored in the RAM 6, based on the time passage signal, and stored it in the non-volatile memory 7. The predetermined value of the timer, namely, a predetermined time passing since the power is cut, is set at the previous value before the backup power is cut.

A reproducing position control method for use with this reproducing system will be described below. When the power is on, the position information detecting part 5 detects the reproducing position information periodically (e.g., every second), based on the position detection control signal outputted from the control part 4. The detected reproducing position information is stored in the RAM 6 by the control part 4, whereby a RAM valid flag is set.

Figure 4:
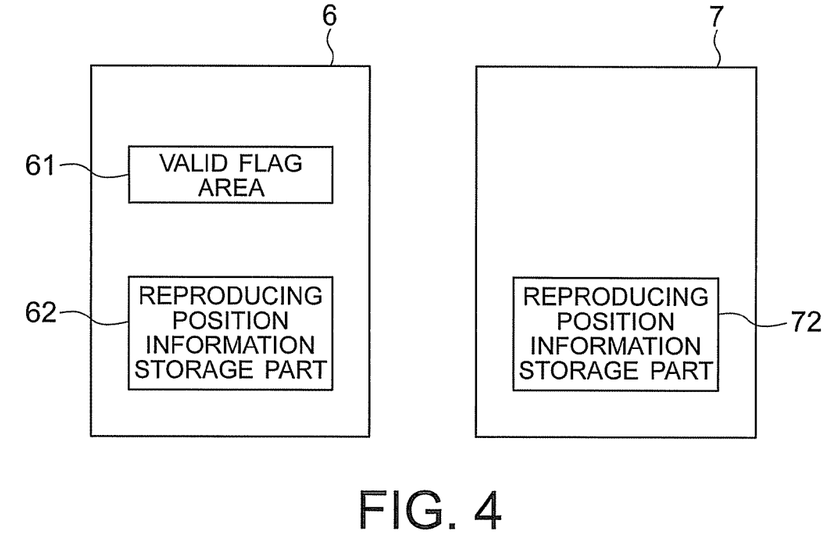
FIG. 4 is a view showing the schematic configuration of a RAM and a non-volatile memory.

FIG. 4 shows the schematic configuration of the RAM 6 and the non-volatile memory 7. In the RAM 6, the RAM valid flag is set in a valid flag area 61, and the reproducing position information is stored in a reproducing position information storage part 62. In the non-volatile memory 7, the reproducing position information is stored in a reproducing position information storage part 72.

Figure 5:
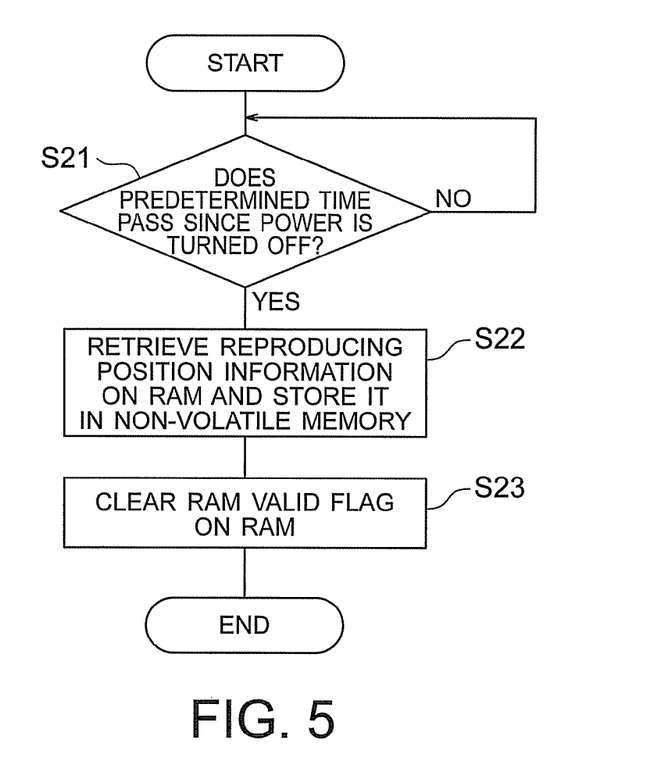
FIG. 5 is a flowchart showing an operation flow of storing the reproducing position information in the non-volatile memory.

FIG. 5 shows an operation flow of retrieving the reproducing position information from the RAM 6 and storing it in the non-volatile memory 7. If a predetermined time passes since the power is turned off (step S21), the control part 4 retrieves the reproducing position information from the RAM 6, based on a time passage signal outputted from the timer 14, and stores it in the non-volatile memory 7 (step S22), and clears the RAM valid flag (step S23).

Figure 6:
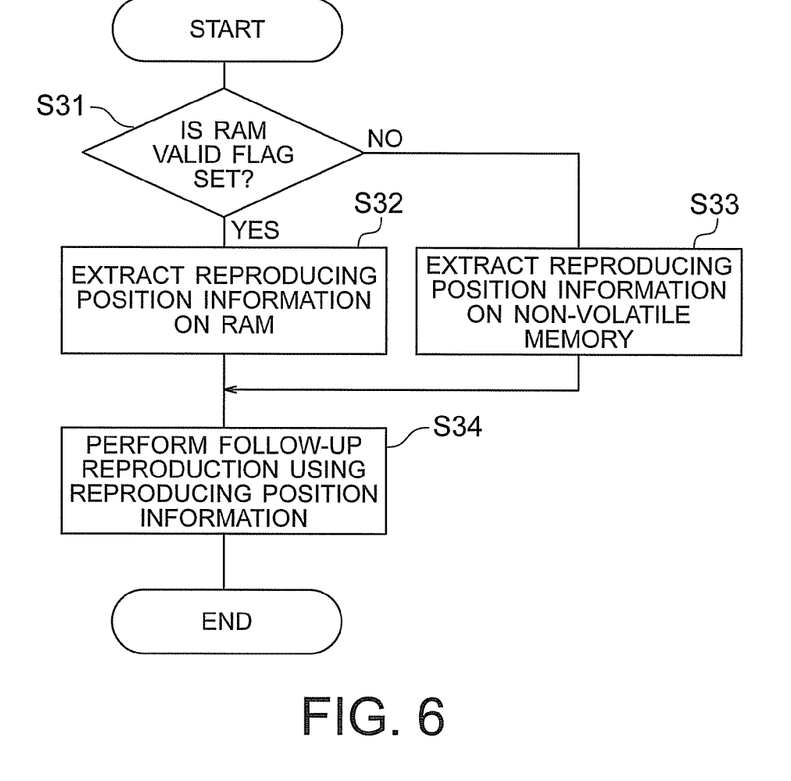
FIG. 6 is a flowchart showing an operation flow of performing the follow-up reproduction.

FIG. 6 shows an operation flow of performing the follow-up reproduction. When the power is turned on again, it is detected whether or not the RAM valid flag is set in the valid flag area 61 of the RAM 6 (step S31).

If the RAM valid flag is set, the reproducing position information stored in the reproducing position information storage part 62 is extracted (step S32), because the reproducing position information within the RAM 6 is the latest reproducing position information.

If the RAM valid flag is not set, the reproducing position information stored in the reproducing position information storage part 72 is extracted (step S33), because the latest reproducing position information is retrieved from the RAM 6 and stored in the non-volatile memory 7. The follow-up reproduction is performed using the reproducing position information extracted in this manner (step S34).

Figure 7:
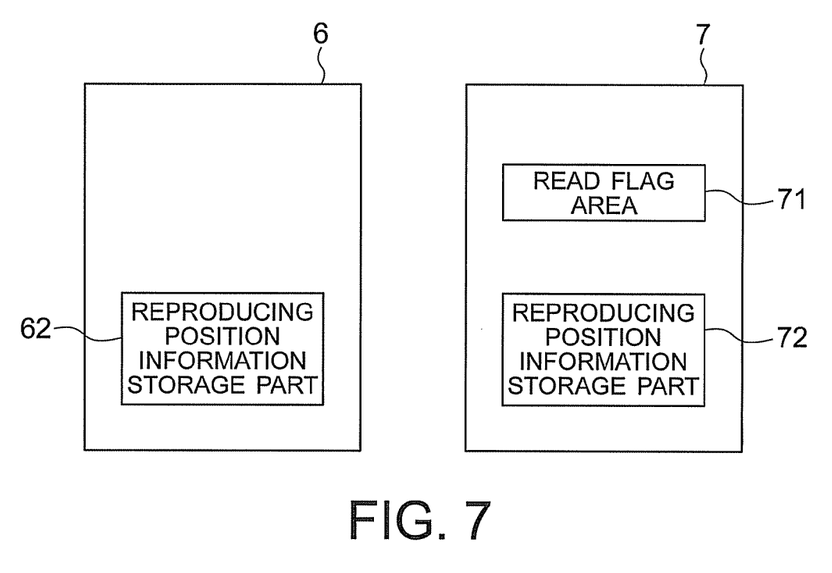
FIG. 7 is a view showing the schematic configuration of a RAM and a non-volatile memory.

The RAM valid flag may not be set in the RAM 6, but a read flag may be set in the non-volatile memory 7. FIG. 7 shows the schematic configuration of the RAM 6 and the non-volatile memory 7 at this time. The read flag is set in a read flag area 71.

When the power is on, the reproducing position information is detected periodically (e.g., every second) by the position information detecting part 5, and the reproducing position information is stored in the reproducing position information storage part 62 of the RAM 6 by the control part 4.

Figure 8:
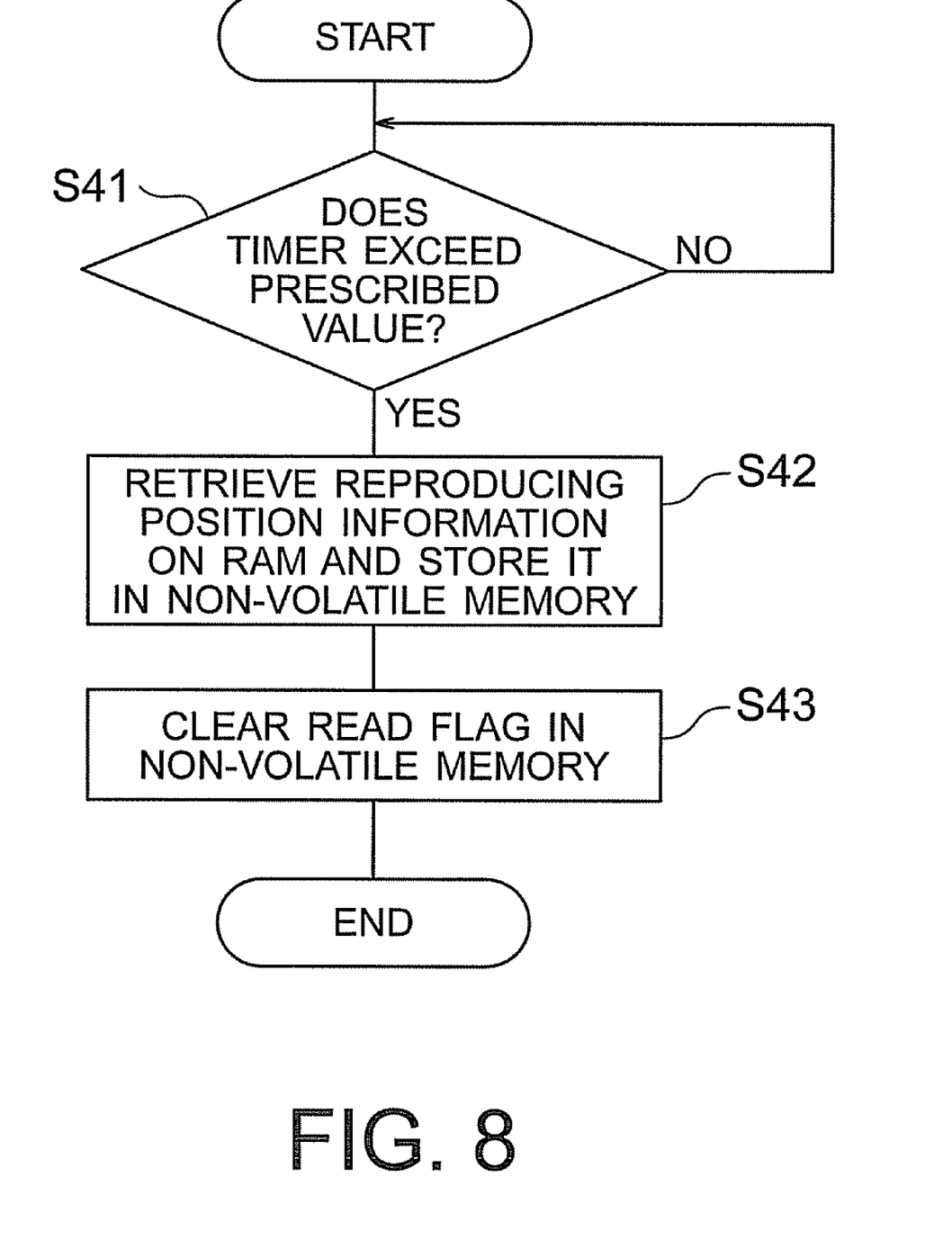
FIG. 8 is a flowchart showing an operation flow of storing the reproducing position information in the non-volatile memory.

FIG. 8 shows an operation flow of retrieving the reproducing position information from the RAM 6 and storing it in the non-volatile memory 7. If a predetermined time passes since the power is turned off (step S41), the control part 4 retrieves the reproducing position information from the reproducing position information storage part 62 of the RAM 6, based on a time passage signal outputted from the timer 14, and stores it in the reproducing position information storage part 72 of the non-volatile memory 7 (step S42). And the control part 4 clears the read flag in the read flag area 71 (step S43).

Figure 9:
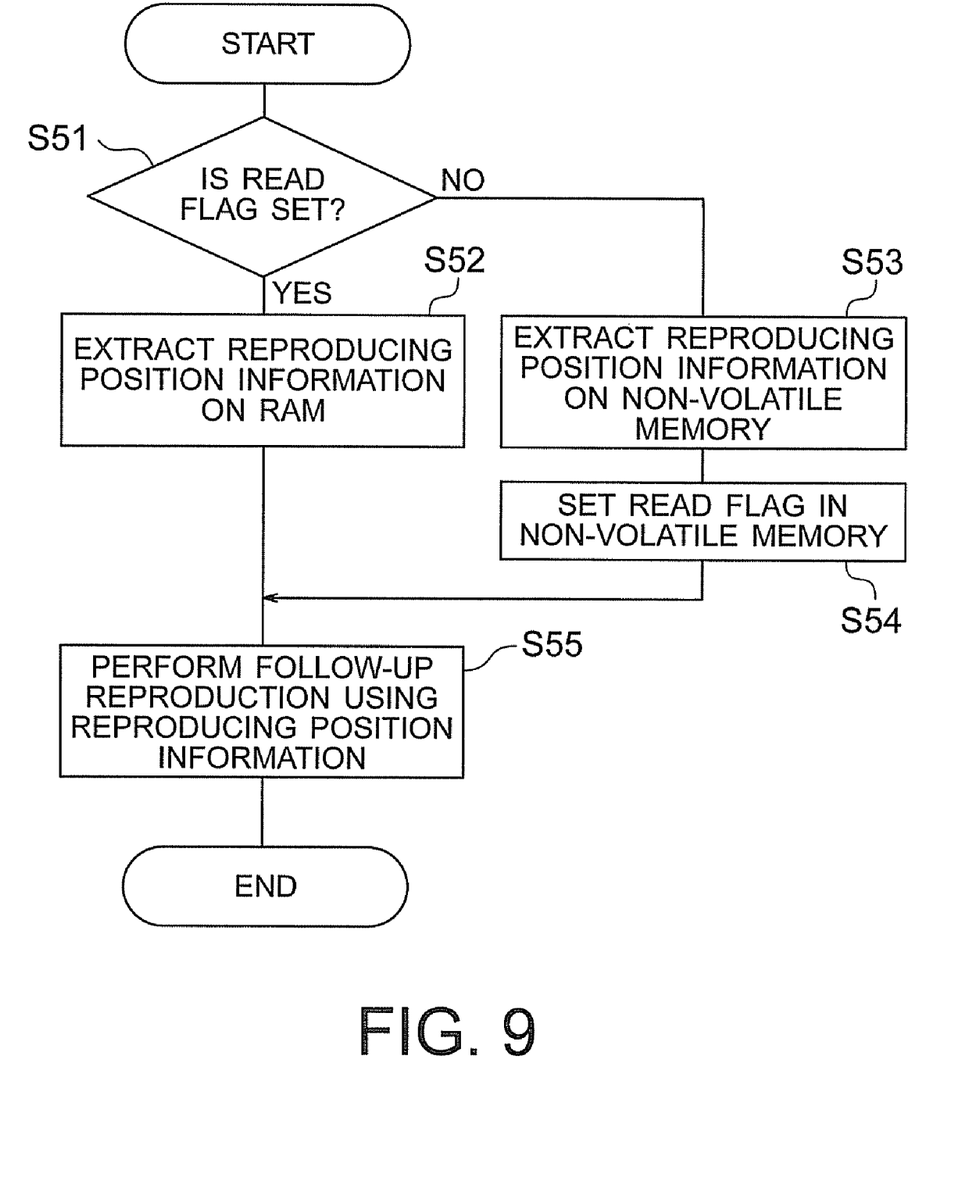
FIG. 9 is a flowchart showing an operation flow of performing the follow-up reproduction.

FIG. 9 shows an operation flow of performing the follow-up reproduction. When the power is turned on again, it is detected whether or not the read flag is set in the read flag area 71 of the non-volatile memory 7 (step S51).

If the read flag is set, the reproducing position information is extracted from the reproducing position information storage part 62 (step S52), because the reproducing position information within the RAM 6 is the latest reproducing position information.

If the read flag is not set, the reproducing position information is extracted from the reproducing position information storage part 72 (step S53), because the reproducing position information within the non-volatile memory 7 is the latest reproducing position information, and the read flag is set (step S54). The follow-up reproduction is performed using the reproducing position information extracted in this manner (step S55).

The reproducing position information within the RAM 6 is stored in the non-volatile memory 7, using the timer 14, after the passage of a predetermined time since the power is turned off, whereby if the power is turned on before the backup power source 13 is cut because it is a short time until the power is turned on again, it is unnecessary to write into the non-volatile memory 7, so that the number of writes into the non-volatile memory 7 can be further reduced.

Also, using the RAM valid flag or read flag, it is possible to discriminate which of the RAM 6 and the non-volatile memory 7 the latest reproducing position information is stored in.

Thus, with the reproducing system according to this embodiment, acquiring and rewriting the reproducing position information are performed many times, and even when the power is off, the reproducing position information can be held securely. Also, the number of writes into the non-volatile memory can be extremely reduced.

Third Embodiment

Figure 10:
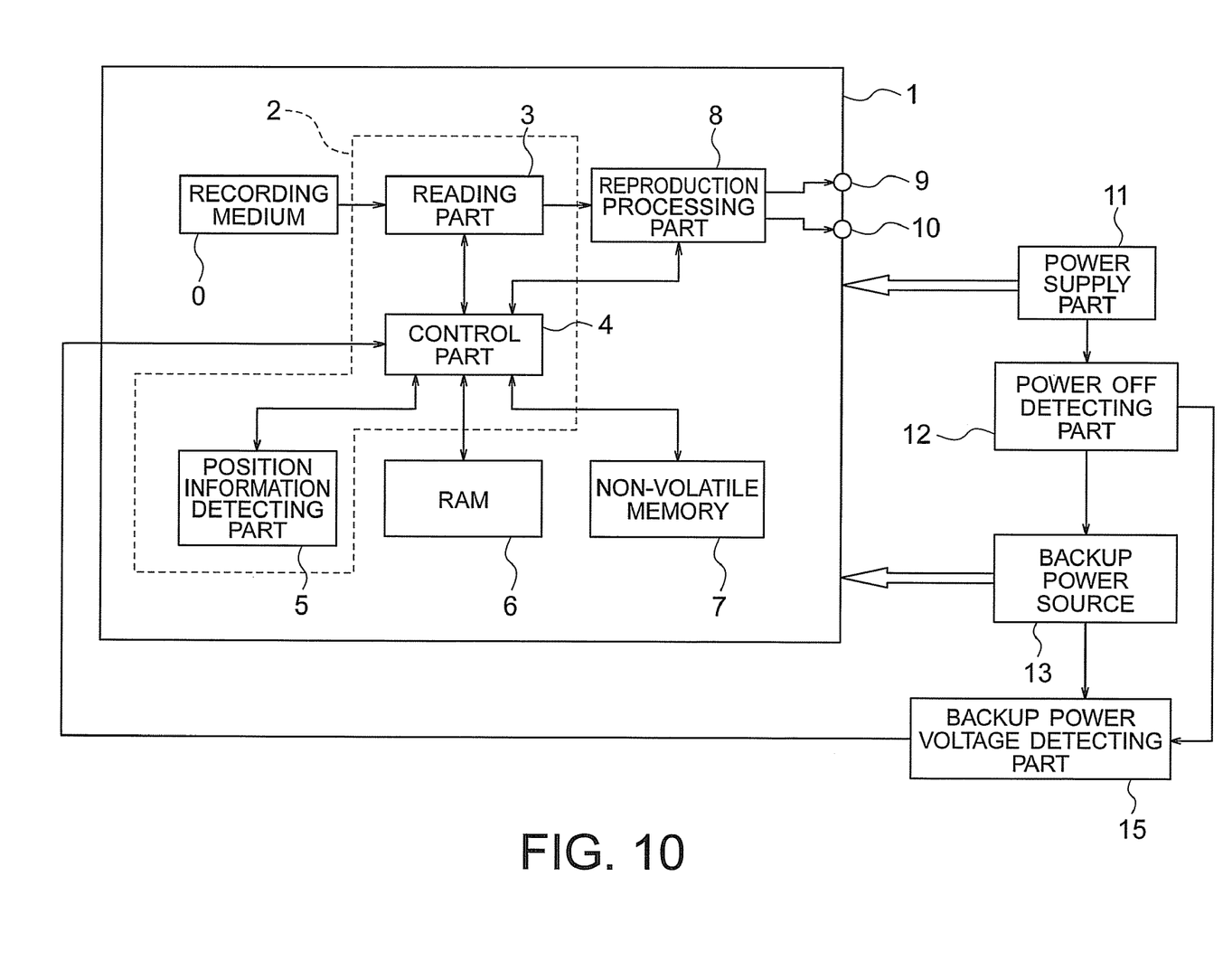
FIG. 10 is a diagram showing the schematic configuration of a reproducing system according to a third embodiment of the invention.

FIG. 10 shows the schematic configuration of a reproducing system according to a third embodiment of the invention. The same parts are designated by the same numerals as in FIG. 1. A backup power voltage detecting part 15 monitors the voltage value of the backup power source 13, and outputs a voltage detection signal to the control part 4 if the voltage value is lower than or equal to a predetermined value.

The control part 4 retrieves the reproducing position information stored in the RAM 6, based on a voltage detection signal, and stored it in the non-volatile memory 7. Storing the reproducing position information in the RAM 6, setting the RAM valid flag or read flag, clearing, and detecting the reproducing position information for the follow-up reproduction are the same as in the second embodiment, and the explanation thereof is omitted.

Using a backup power voltage detecting part 15, it is detected that the voltage value of the backup power source 13 is lower than or equal to the predetermined value, and at this time the reproducing position information within the RAM 6 is stored in the non-volatile memory 7. Thereby, if the power is turned on before the backup power source 13 is cut because it is a shorter time until the power is turned on again, it is unnecessary to write into the non-volatile memory 7, so that the number of writes into the non-volatile memory 7 can be reduced.

Also, using the RAM valid flag or read flag, as in the second embodiment, it is possible to discriminate which of the RAM 6 and the non-volatile memory 7 the latest reproducing position information is stored in.

Thus, with the reproducing system according to this embodiment, acquiring and rewriting the reproducing position information are performed many times, and even when the power is off, the reproducing position information can be held securely. Also, the number of writes into the non-volatile memory can be extremely reduced.

Figure 11:
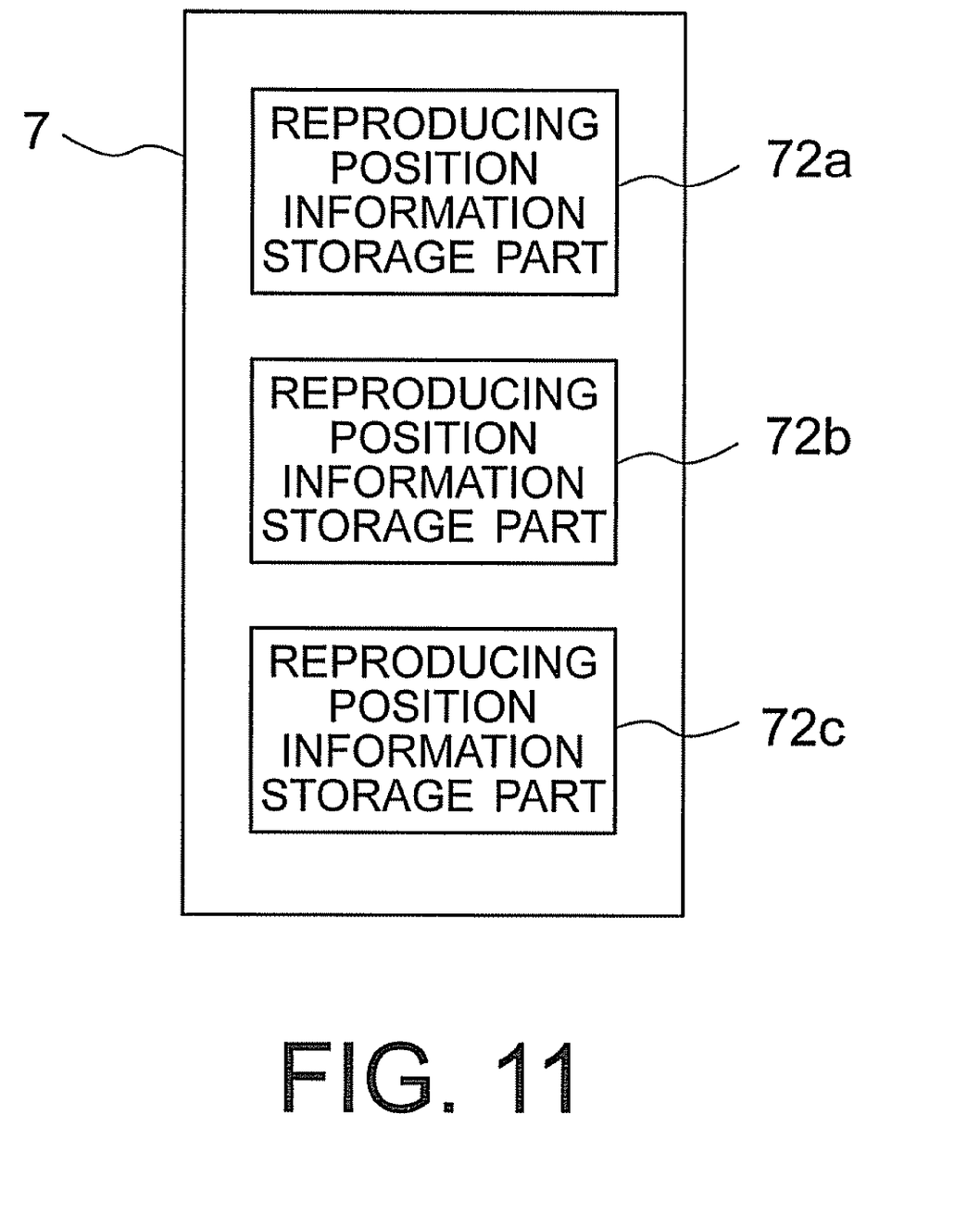
FIG. 11 is a view showing the schematic configuration of a non-volatile memory.

The non-volatile memory 7 in the above embodiments may have a plurality of reproducing position information storage parts, as shown in FIG. 11. In FIG. 11, three reproducing position information storage parts 72a to 72c are provided, as one example. Herein, the number of writes is recorded together with the reproducing position information in each reproducing position information storage part.

Figure 12:
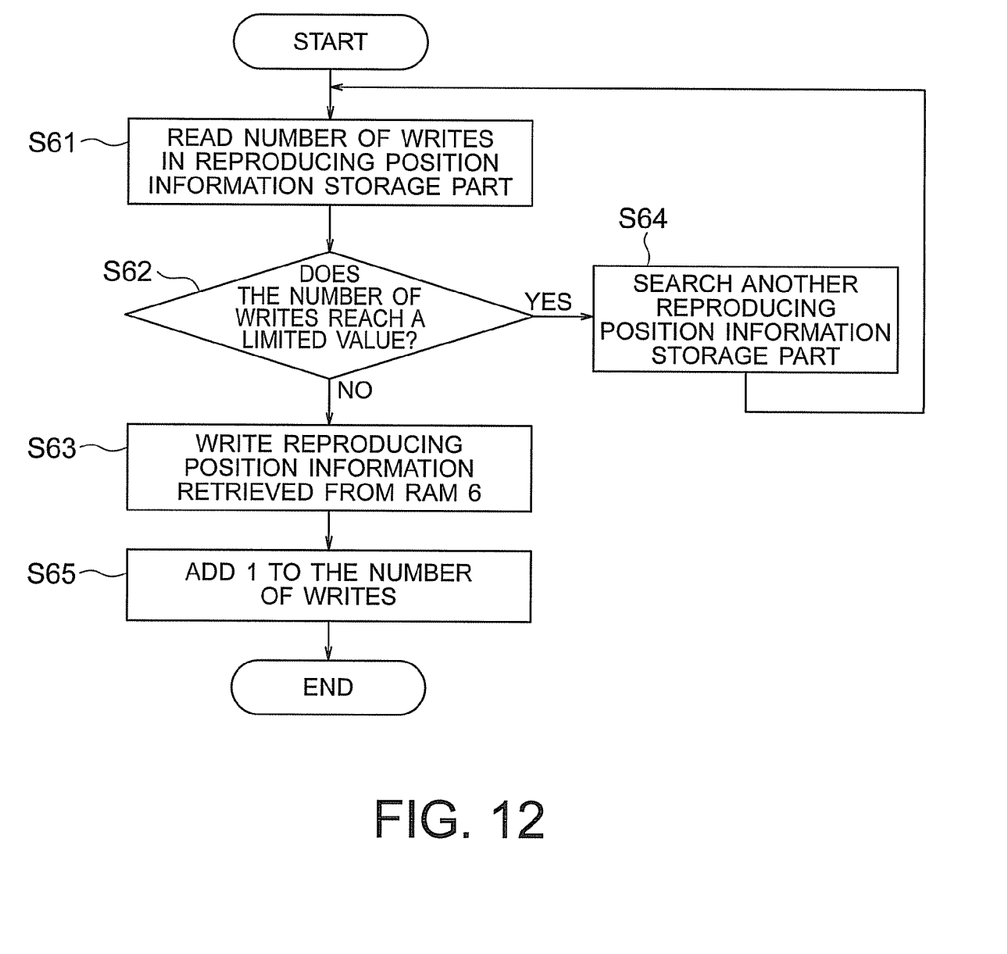
FIG. 12 is a flowchart showing a write operation for the reproducing position information.

Each reproducing position information storage part has a limited number of writes. If the limited number is reached, the reproducing position information is written into another reproducing position information storage part. Referring to FIG. 12, the flow of writing the reproducing position information into the non-volatile memory 7 with such configuration will be described below.

First of all, the number of writes in the reproducing position information storage part is read (step S61). And it is determined whether or not the number of writes reaches the limited number (step S62).

If the limited number of writes is reached, another reproducing position information storage part is searched (step S64). If not, the reproducing position information retrieved from the RAM 6 is written into the reproducing position information storage part (step S63), and the recorded number of writes is incremented by 1 (step S65).

Figure 13:
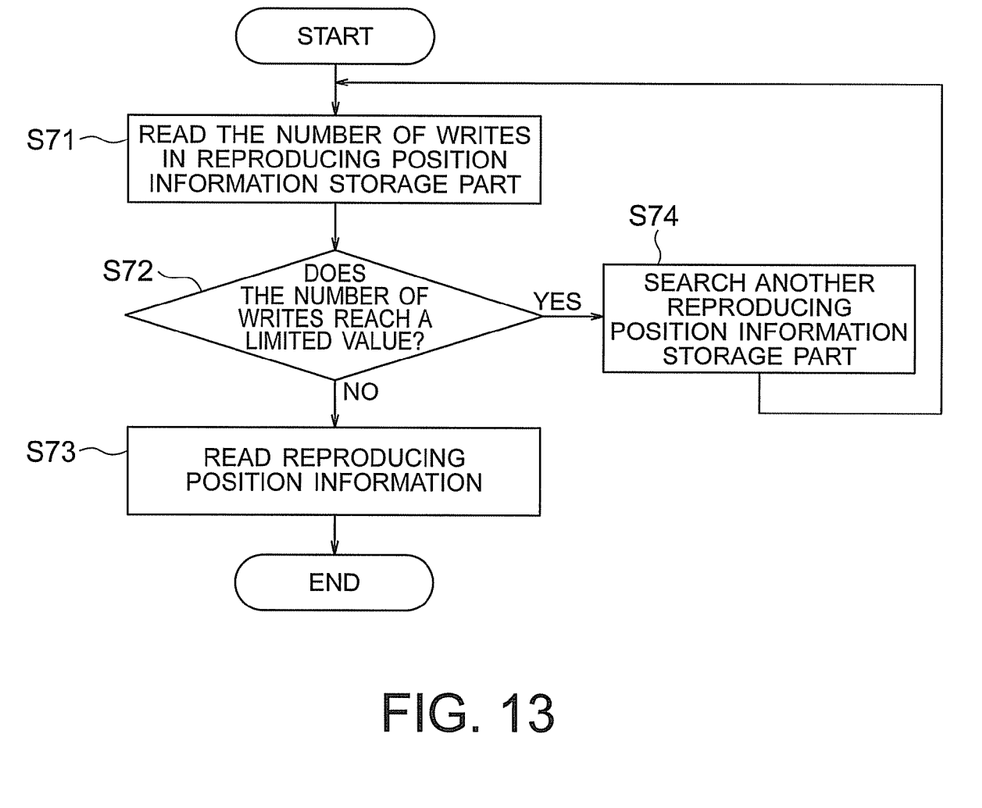
FIG. 13 is a flowchart showing a read operation for the reproducing position information.

Referring to FIG. 13, the flow of reading the reproducing position information will be described below. First of all, the number of writes in the reproducing position information storage part is read (step S71). And it is determined whether or not the number of writes reaches the limited number (step S72).

If the limited number of writes is reached, another reproducing position information storage part is searched (step S74). If not, the reproducing position information is read from the reproducing position information storage part (step S73)

The reproducing position information storage parts from which the number of writes is read are ordered beforehand, for example, in the order of the reproducing position information parts 72*a*, 72*b* and 72*c*. Thereby, the reproducing position information can be written into the reproducing position information storage part where the limited number of writes is not reached among plural reproducing position information storage parts.

Also, the latest reproducing position information can be read. In this manner, the number of writes in the non-volatile memory 7 can be increased by providing plural reproducing position information storage parts.

When the reproducing system according to the above embodiments is mounted on the vehicle, the power supply from the power supply part 11 can be turned on or off by switching on or off a vehicle main key.

In the above embodiments, a checksum for the reproducing position information may be provided, instead of the RAM valid flag.

Also, a backup power source dedicated for holding data in the RAM 6 may be provided separately from the backup power source 13, whereby the backup power source 13 may supply power only when the reproducing position information within the RAM 6 is written into the non-volatile memory 7.

What is claimed is:

1. A reproducing position control circuit comprising:
   a reading part for reading data stored in a recording medium;
   a position information detecting part for detecting the position information of data read by said reading part within said recording medium; and
   a control part for storing said position information detected by said position information detecting part in a volatile memory, and retrieving said position information within said volatile memory to store it in a writable non-volatile memory when the power is turned off or after a predetermined time passes since the power is turned off.

2. The reproducing position control circuit according to claim 1, wherein said control part sets a valid flag in said volatile memory when storing said position information in said volatile memory, and clears said valid flag when retrieving said position information within said volatile memory and storing it in said non-volatile memory.

3. The reproducing position control circuit according to claim 2, wherein said control part detects whether or not said valid flag is set in said volatile memory when said power is turned on, and if so, retrieves said position information stored in said volatile memory, or if not, retrieves said position information stored in said non-volatile memory.

4. The reproducing position control circuit according to claim 1, wherein said control part clears a read flag in said non-volatile memory when storing said position information in said non-volatile memory.

5. The reproducing position control circuit according to claim 4, wherein said control part detects whether or not said read flag is set in said non-volatile memory when said power is turned on, and if so, retrieves said position information stored in said volatile memory or if not, retrieves said position information stored in said non-volatile memory and sets said read flag.

6. A reproducing position control circuit comprising:
   a reading part for reading data stored in a recording medium;
   a position information detecting part for detecting the position information of data read by said reading part within said recording medium; and
   a control part for storing said position information detected by said position information detecting part in a volatile memory, and retrieving said position information within said volatile memory to store in a writable non-volatile memory, if the voltage of a backup power source, which is turned on when the power supply is turned off, is less than or equal to a predetermined value.

7. The reproducing position control circuit according to claim 6, wherein said control part sets a valid flag in said volatile memory when storing said position information in said volatile memory, and clears said valid flag when retrieving said position information within said volatile memory and storing it in said non-volatile memory.

8. The reproducing position control circuit according to claim 7, wherein said control part detects whether or not said valid flag is set in said volatile memory when said power is turned on, and if so, retrieves said position information stored in said volatile memory or if not, retrieves said position information stored in said non-volatile memory.

9. The reproducing position control circuit according to claim 6, wherein said control part clears a read flag in said non-volatile memory when storing said position information in said non-volatile memory.

10. The reproducing position control circuit according to claim 9, wherein said control part detects whether or not said read flag is set in said non-volatile memory when said power is turned on, and if so, retrieves said position information stored in said volatile memory, or if not, retrieves said position information stored in said non-volatile memory and sets said read flag.

11. A reproducing system comprising:
    a reading part for reading data stored in a recording medium;
    a reproduction processing part for reproducing and outputting the read data;
    a position information detecting part for detecting the position information of data read by said reading part within said recording medium;
    a power off detecting part for detecting that the power is turned off to output a power off detection signal;
    a volatile memory capable of storing said position information;
    a writable non-volatile memory capable of storing said position information; and
    a control part for storing said position information detected by said position information detecting part in said volatile memory, and retrieving said position information within said volatile memory and storing it in said non-volatile memory, based on said power off detection signal.

12. The reproducing system according to claim 11, wherein said control part retrieves said position information stored in said non-volatile memory when said power is turned on.

13. The reproducing system according to claim 11, further comprising a timer for receiving said power off detection signal outputted from said power off detecting part and outputting said power off detection signal to said control part after a predetermined time passes.

14. The reproducing system according to claim 13, wherein said control part sets a valid flag in said volatile memory when storing said position information in said volatile memory and clearing said valid flag when retrieving said position information within said volatile memory and storing it in said non-volatile memory.

15. The reproducing system according to claim 14, wherein said control part detects whether or not said valid flag is set in said volatile memory when said power is turned on, and if so, retrieves said position information stored in said volatile memory, or if not, retrieves said position information stored in said non-volatile memory.

16. The reproducing system according to claim 13, wherein said control part clears a read flag in said non-volatile memory when storing said position information in said non-volatile memory.

17. The reproducing system according to claim 16, wherein said control part detects whether or not said read flag is set in said non-volatile memory when said power is turned on, and if so, retrieves said position information stored in said volatile memory, or if not, retrieves said position information stored in said non-volatile memory and sets said read flag.

* * * * *